US006282539B1

(12) United States Patent
Luca

(10) Patent No.: US 6,282,539 B1
(45) Date of Patent: Aug. 28, 2001

(54) METHOD AND SYSTEM FOR DATABASE PUBLISHING

(76) Inventor: Anthony J. Luca, 101 Bennington Dr., Chapel Hill, NC (US) 27516

(*) Notice: Subject to any disclaimer, the term of this patent is extended or adjusted under 35 U.S.C. 154(b) by 0 days.

(21) Appl. No.: 09/144,471

(22) Filed: Aug. 31, 1998

(51) Int. Cl.$^7$ ........................................... G06F 17/30
(52) U.S. Cl. .................... 707/6; 707/3; 707/4; 707/5; 707/104
(58) Field of Search .................. 707/3, 4, 5, 6, 707/104, 500, 507, 513, 514, 517; 705/1, 52, 54, 80; 700/213, 220; 713/187, 200

(56) References Cited

U.S. PATENT DOCUMENTS 6,070,175 * 5/2000 Mezei .................................. 707/500

OTHER PUBLICATIONS

"Datazone adds charts to Miramo" (Product Announcement) Seybold Report on Publishing Systems, v28, n2, (p12), Sep. 1998.*
"Ideas for Onsite Entrepreneurs" (Editorial), Food Management, 34, 4, 8, (pp. 1–2), Apr. 1999.*
IEEE Publication, "DataWeb: Customizable Database Publishing for the Web" by Miller et al., Ohio State University, Columbus, Ohio, pp. 14–21, Oct. 1997.*
Publish Right, "Automated Publishing Using FM Publisher" brochure, pp. 1–10, Jan. 1996.*
Seagate Crystal Reports, "The Market–Leading Desktop Query and Report Writer" brochure, pp. 1–4, Jan. 1997.*
Datazone Ltd. brochure regarding Miramo product, ©1993–1996.
PublishRight Incorporated brochure regarding FM Publisher product ©1996 and 1997.
Seagate Software, Inc. brochure regarding Crystal Reports product ©1997.
Adobe Systems, Inc. catalog entitled FrameMaker Database Publishing Directory, dated Feb. 1997.
Adobe Systems, Inc. catalog entitled FrameMaker Consultant Catalog, dated Feb. 1997.
Guidance web page printout regarding Catalogger product, web page modified Dec. 8, 1995.

* cited by examiner

Primary Examiner—Thomas Black
Assistant Examiner—Diane D. Mizrahi
(74) Attorney, Agent, or Firm—Millen, White, Zelano & Branigan, P.C.

(57) ABSTRACT

A method for direct connection between a data server, such as a database compliant with Open Database Connectivity and Structured Query Language, and a formatting engine using a hierarchical structure of target objects, token manager objects, and pattern objects to query data records from the database and to create an output document for a formatting engine, wherein the target objects contain the contents of the document, the token manager objects manage the insertion of data and their logical location in the document, the pattern objects perform queries on the data source, and wherein the token manager objects reflect the structure of the actual output document and the target objects reflect the logical structure of the desired output based upon the structure of the database, whereby the target objects manipulate the document through the token manager objects and the two structures are decoupled.

7 Claims, 15 Drawing Sheets

Microfiche Appendix Included
(25 Microfiche, 1185 Pages)

METHOD AND SYSTEM FOR DATABASE PUBLISHING

BACKGROUND OF THE INVENTION

This disclosure includes a microfiche appendix having 1185 frames and 25 microfiche.

1. Field of the Invention

The present invention relates in general to methods for database publishing, and in particular to a method for creating a direct link from one or more data server, such as an Open Database Connectivity (ODBC) and Structured Query Language (SQL) compliant data source, into a desktop publishing application.

2. Description of the Background Art

Traditionally, databases have been used to manage vast amounts of data where quick access and flexible selection and sorting are crucial. Since a database's primary mission is to store rapidly changing data, report generation tools have often stressed speed of report development over the presentation of information. As a result, it is often difficult or impossible to prepare a polished report when the underlying data will be changed when the report is finished.

Publishing systems, on the other hand, typically focus on more stable information such as user documentation, manuals and instructions. As a result, most publishing systems offer tools to more effectively communicate fixed information rather than tools that dynamically accommodate changing data.

Technology has moved to the point where compromising between a database's need for speed, and a publishing system's emphasis on quality of output, is no longer acceptable. Thus, the technique known as database publishing is created through the marriage of database and publishing system. Database publishing bridges the gap between speed of report generation and documentation quality.

Database publishing, therefore, is defined here as a data-driven method of generating formatted documents for printed media and electronic formatted documents (i.e., PDF and HTML file formats). The usual method of creating such documents is manually through a desktop publishing application. However, if the contents of the document are presented in repeating structural patterns, then creating and using a method to create the document that is automatic and controlled by the data being published would be far more efficient than creating that same document manually. Examples of documents that fall in this category are catalogs (i.e., product and course), directories (i.e., informational, phone, and membership), manuals (i.e., instructional, procedural, test and maintenance), reference books, and reports (i.e., financial and statistical).

Traditionally, two processes have been implemented with software to perform database publishing. They are report generators and tagged intermediate output applications.

Report generators are the paradigm most often used for creating formatted output from a database. Their use can be seen as a template or pattern that gets repeated over and over again, depending on how many rows are in the result set of a given query. Each data item has a specific place in the pattern. The space allocated to each data item may expand or contract as the size of the data values changes from row to row, but the positions of the data fields never changes. Report generators typically create final printed pages and have limited formatting capability. There is also no intermediate output that can be modified before the pages are printed.

Tagged intermediate output has been commonly used to extract data from a database into a formatted document. A tagged intermediate output file is typically an American National Standard Code for Information Interchange (ASCII) file that uses a markup language that is proprietary to the target formatting engine. This type of process typically uses an application to extract information from a database and create a flat file or series of flat files that contain the database information and an application specific tag set. Another application may be used to allow a standard desktop application (i.e., Quark's Xpress, Adobe's PageMaker or FrameMaker, etc.) to import the flat file or files.

There are a number of variations on this tagged intermediate output method. These are: Database-specific applications, which generally are limited in that only one database type can be used as a data source; desktop-application-specific tagging, in which a tagging method specific to a desktop publishing application is used in a database output file; and desktop application independent tagging, which uses an output file tagging method that is generic in that another application is used to convert information for use with each specific desktop publishing application.

SUMMARY OF THE INVENTION

In view of the above, it is an object of the present invention to provide an improved method for database publishing.

The invention according to a preferred embodiment provides a method for creating a data-driven document using a novel software architecture, including the steps of decomposing the data that is to be published into hierarchical structural elements and relating these elements to document objects such as text flows, tables, table rows and paragraphs; using instances from two classes of cooperating objects that relate the hierarchical structure of the data as it will be presented with the hierarchical structure of the final document; using this configuration of objects to create the output document from the data itself; and translating the document into an electronic format suitable for publishing either to print media or in electronic form.

Specifically, one aspect of the invention is a method for database publishing which has an architecture that allows a direct link from one or more data server, such as an ODBC and SQL-compliant data source, to a formatting engine, wherein the architecture includes a class of fundamental objects and a class of publishing tokens in the architecture. The fundamental objects include: string templates, targets, patterns, connections, queries, variables, conditions; and, the publishing tokens include document tokens, page tokens, flow tokens, and table tokens.

More specifically, the invention provides a method for direct connection between one or more databases compliant with Open Database Connectivity and Structured Query Language and a formatting engine using a hierarchical structure of target objects, token manager objects, and pattern objects to query data records from the database and to create an output document to the formatting engine, wherein the target objects contain the contents of the document, the token manager objects manage the insertion of data and their logical location in the document, the pattern objects performs queries on the data source, the token manager objects reflecting the structure of the actual output document and the target objects reflecting the logical structure of the desired output based on the structure of the database, whereby the target objects manipulate the document through the token manager objects, and the two structures are decoupled.

Upon further study of the specification and appended claims, further objects and advantages of this invention will become apparent to those skilled in the art.

BRIEF DESCRIPTION OF THE DRAWINGS

The foregoing and other objects, features, and advantages of the invention will be apparent from the following more particular description of preferred embodiments as illustrated in the accompanying drawings, in which reference character refer to the same parts throughout the various views. The drawings are not necessarily to scale, emphasis instead being placed upon illustrating principles of the invention.

In the accompanying drawings:

FIG. 4 is a screen sample of a Query Properties dialog window.

FIG. 7 is a screen sample of a Pattern Builder Paragraph Target Property dialog box.

DETAILED DESCRIPTION OF THE PREFERRED EMBODIMENTS

Figure 1:
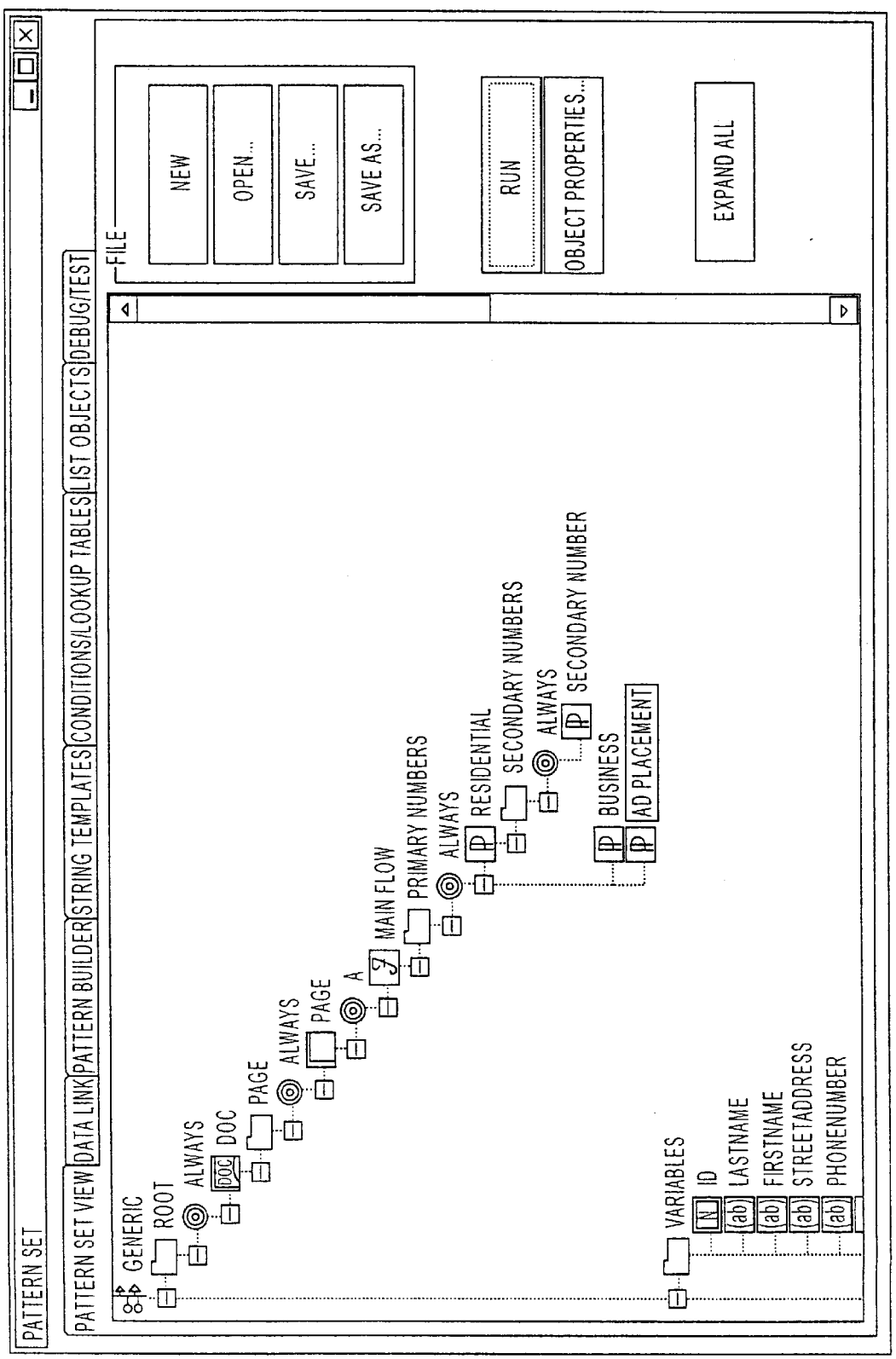
FIG. 1 is a screen sample of a Pattern Set View tab dialog.

The database publishing architecture of the present invention is preferably provided using Open Database Connectivity (ODBC), Standard Query Language (SQL), Microsoft Visual C++, Adobe FrameMaker, and Frame Developer's Kit (FDK). These choices provide benefits (e.g., open connectivity) with some limitations (e.g., platform constraints).

There are preferably three principle elements in the database publishing solution of the present invention: one or more ODBC and SQL-compliant database, a text formatting engine, and an inter-application communication and control architecture.

The database provides a system for data entry, manipulation, selection and sorting. A text formatting engine, such as Adobe FrameMaker, used in conjunction with the present invention can integrate with virtually any database system. Databases that have previously been integrated with FrameMaker in a database publishing environment include Informix, Oracle, Sybase, Wacom, SQL Server, and ACIUS 4th Dimension.

The Text Formatting Engine, such as the FrameMaker and FrameViewer text engines, reads the database (SQL) output and dynamically manages formatting such as line breaks, page breaks, images, and header and footer information. FrameMaker and FrameViewer also handle document management issues, such as importing referenced graphics, printing, viewing, saving and hypertext navigation of on-line database publishing output.

The present invention, which in a preferred embodiment provides an inter-application communication and control architecture, manages database information resulting from queries by placing them into a series of objects that are controlled by user defined schemes. The schemes may include information on which variable database information may be placed into text strings, tables, text frames, and image frames. The schemes also describe how FrameMaker template is to be used in formatting each object.

The present invention has a Graphical User Interface (GUI) that is used to establish the scheme and control the publishing process. Conditions may be established to determined which information is published, and where it is published, based on the database query results.

The use of ODBC data source connectivity in the architecture of the invention allows connections to multiple databases and flat files (spreadsheets and text) at a time to a publish documents. This allows multiple information sources to be used to publish pattern-based documents or document segments.

For complex requirements, this control architecture could be provided in the form of an artificial intelligence-based system that requests different database reports based on the user's knowledge or security levels. The complexity or simplicity of this control application is defined by the developer's needs.

As mentioned above, the architecture of the invention in a preferred embodiment uses two classes of cooperating objects to extract data from one or more external data sources, such as ODBC and SQL-compliant databases, and the data is inserted into a document using a desktop publishing engine to format the data.

One of the two classes is a class of fundamental objects. These objects are: string templates, targets, patterns, connection, query, variable and conditions. The following is a description of each of the fundamental objects.

String Templates

String templates are composed of database variables, constant strings, hypertext and index markers, graphic insets, etc., each segment containing its own formatting characteristics. At any time, the system can build text output based on the current value of the variables and conditionals that make up the string templates.

Specific strings of text are generated by using String Template Objects. These objects contain a series of segments containing constant and variable textural content along with format characteristics. The current values of any variable along with the static segments are used to create a specific instance of text.

Targets

Targets are objects that direct the text output created from building instances of various string templates and place them at various logical points in a formatting engine (e.g.

FrameMaker) document. Each target class has a Generate Method used to create a specific type of document entry. Pages, tables, rows, table cells, and paragraphs can all be targets for the string template instances. For example, a Table Target generates a table using a specific table format, and a Page Target generates a series of pages using a specified master page (or layout).

Target contain one or more String Template objects used to generate the actual text.

Patterns

Each pattern is associated with a query. When a pattern is executed, it first performs the query, then cycles through each resulting row of the query. The execution is controlled by the data, the number of times each pattern is repeated depends on the number of rows in the result set.

A pattern can contain sub-patterns. When a pattern executes, during each cycle any sub-patterns are completely executed. For example, a pattern may have a query for all of the corporations in a given State, the sub-pattern may be all of the executive officers for a given company. At each cycle of the top level pattern, the sub-pattern cycles through all of the executive officers for the current corporation.

Each pattern object contains one or more Target Objects. During each cycle of the execution phase.

Patterns are objects that mirror the hierarchical structure of a series of SQL queries and sub-queries. With this architecture, a user could set up hierarchical structures of patterns and sub-patterns using different master pages and/or table formats, multiple row configurations within the same table, arrangements of unanchored frames on each body page, and complex hierarchical sub-queries within each flow or even each table cell.

Connection

A connection generally comprises a logical connections to a data source. A data source can be tab delimited ASCII file or an open database connectivity (ODBC) data source. Connections can also be made multiple data sources at a time.

Query

Query objects are encapsulated specific requests to an assigned Connection Object for data. Each query is first executed and then the resulting data is accessed by looping through a series of fetch cycles. Query objects invoke standard query language (SQL) commands to the database engine.

Variable

A variable is generally a named memory location. During each fetch cycle, the contents of these variables are updated to reflect the current result set. The name of the variable makes the current contents available to the other objects in the system.

Conditions

Conditions are objects that return a truth value based on current values from a database. They can be used to determine what information is transferred and how the information is formatted.

The architecture has a model of objects that are used to handle the query results. For example, string templates contain strings objects, which may be a character, a word, a phase, a paragraph, constant (non-database contained) text, markers, or other information. A string template is a grouping of string objects. This allows complete formatting control of information, whether it appears in a flow or table, on a character-by-character or object-by-object basis.

Because of our experience with database publishing to FrameMaker tables, the model was constructed to insert data into the most complex table layouts directly from the database. Varying table straddles, shading, and formats present no challenge to the architecture. Character formatting can even be changed on the fly to ensure that table cells don't wrap.

Images, text flow, and tables are all objects that are filled by the database and used to populate the resulting FrameMaker document. In short, the architecture can handle any difficult database publishing project—from directors with complex queries to multiple databases to catalogs with the varied page layouts. At this time, there is not a product that the architecture cannot successfully publish.

Since FrameMaker is the publishing engine, the system output can be in the form of FrameMaker, PDF, and HTML file formats. The database publishing architecture can take advantage of this, allowing users the capability of specifying output file requirements before or after database publishing.

In addition to the class of objects set forth above, another class of class of objects in this architecture are the Document Tokens. They act as the interface between the database publishing application and the formatting engine. They also manage the insertion of text and keep the information regarding its logical location. These token objects allow a document to be viewed as sequence of elements that together make up the document For live document publishing, these token objects obtain actual locations to insert text by using the current element they are assigned to manage. They can also obtain other useful information from the formatting engine, such as page breaks and line wraps.

The other class is a class of objects called publishing tokens. All the database publishing objects operate on the document through the use of these tokens in the present invention. The following is a collection of possible Publishing Token classes and how they operate:

Document Token

These tokens manage the creation of documents using a specific document template. They also manage the insertion of global text, such as variable formats and running headers and footers. Additionally, they can be used to manage the insertion of text using global markers when there is a large amount of static content.

Page Token

These tokens are used to manage page layouts. A given token can generate sets of connected pages with the same background. The objects, such as text flows and unanchored graphics, that make up the page background are manipulated through the Page Token.

Flow Token

All desktop publishing applications use a concept called a text flow, which is sequential text in some relation to the document structure. For example, most documents are composed of one large text flow. However, in some applications, a single cell in a table can be thought of as text flow. A Flow Token manages the insertion of text in a text flow.

Table Token

Table tokens manage the creation of tables with a given table tag, or format. Insertion of text into the rows and columns of tables having a given format is done through the use of a single Table Token object. A Table Token knows where the heading and footing rows of the current table are located. It also knows where the next body row needs to be inserted. It also can be used to keep track of and eliminate any unused rows or columns.

The Targets are the database Publishing Objects that use these Publishing Tokens. The followings are further characteristics of the Targets in the architecture of the present invention in its preferred embodiment. Targets can insert text using a Document Token without having to know or be concerned with where the text will be located in the current document. Targets get passed a document token from some other Target object, operate on that token and pass the token to the next Target Object. Targets can use a Token to create other tokens which can be then passed to subsequent Targets. Delineating data-drive output using Patterns and Targets is a recursive process and the complexity of the desired output is only limited to the capabilities of the formatting engine itself.

Figure 14:
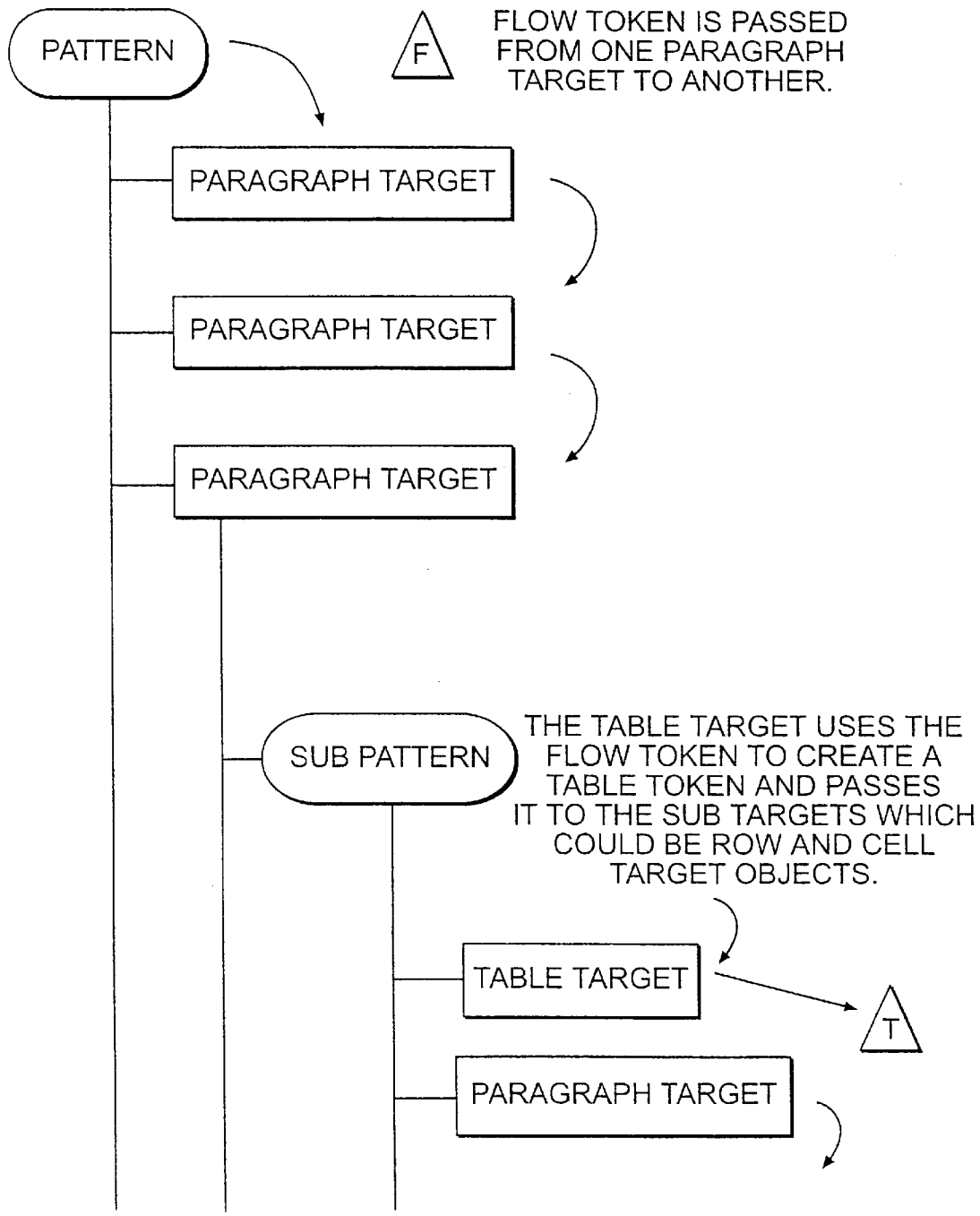
FIG. 14 is an example of the hierarchical structure of the invention.

FIG. 14 shows an example of a possible hierarchical structure of objects used in the present invention.

The architecture set forth above is used in a process for creating data driven documents. The process preferably includes the following steps: Decompose the data that is to be published in to hierarchical structural elements and relate these elements to document objects such as text flows, tables, table rows and paragraphs;

Use instances from two classes of cooperating objects that relate the hierarchical structure of the data as it will be presented with the hierarchical structure of the final document;

Next, use this configuration of objects to create the output document from the data itself; and Translate the document into an electronic format suitable for publishing either to print media or the web.

Although the architecture of the invention is useful in a broad range of applications, it specifically addresses publishing problems having the following general requirements as follows.

The data should be repetitive in nature to the extent that it would appear to the reader of the document that she sees the same structure or pattern of information repeated over and over again. There can be more than one pattern, the patterns can change conditionally and they can be very complex.

The architecture can use an already existing formatting engine, such as desktop publishing application, to actually create the document. The formatting engine should have the following properties. It should have an API (Application Programmer's Interface) in order to be able to insert text and other publishing content into the document programmatically rather than manually through a user interface. The view of a document through the API should be structured, that is, documents contain pages which can contain paragraphs and tables. Tables contain rows and columns which can additionally contain paragraphs and images, etc. The API should also be able to return the logical location of the text that is being inserted in the document. By logical location, we mean relative to the structured objects such as tables and paragraphs, as opposed to physical locations, which would be the x-y coordinates on a given page. The desktop publishing application should have some notion of a template for the various structured objects that it manages. For example, paragraphs could have paragraph tags that allow you to generate multiple paragraphs all having the same format characteristics.

As mentioned above, Adobe's FrameMaker is preferably used as the formatting engine in conjunction with the present invention. However, any formatting engine generally meeting the aforementioned properties can be used.

Also, as mentioned above, the present invention is preferably used with ODBC and SQL compliant databases. However, any data server that could be queried for data, such as Excel or other spreadsheet, Active X Server, or HTML files, can be used.

The Graphical User Interface (GUI) feature of the present invention is now described.

The GUI of the present invention has in its preferred embodiment the following tabs: Pattern Set View, Data Link, Pattern Builder, String Template Builder, Conditions/Lookup Table, List Objects, and Debug/Test. Each tab is used to control specific functions and features.

The following pages present various views of the GUI interface in accordance with FIGS. 1–13.

Pattern Set View

FIG. 1 shows the dialog box that is used to control the operation of the present invention and view database publishing pattern. Database publishing pattern set template (*.pst) files are also opened and saved through this dialog box. This allows database publishing templates to be saved and schemes easily recalled and used when products need to be published. Additionally, it provides another way to access information quickly. From this point, the user can select and open the applicable dialog boxes.

Figure 2:
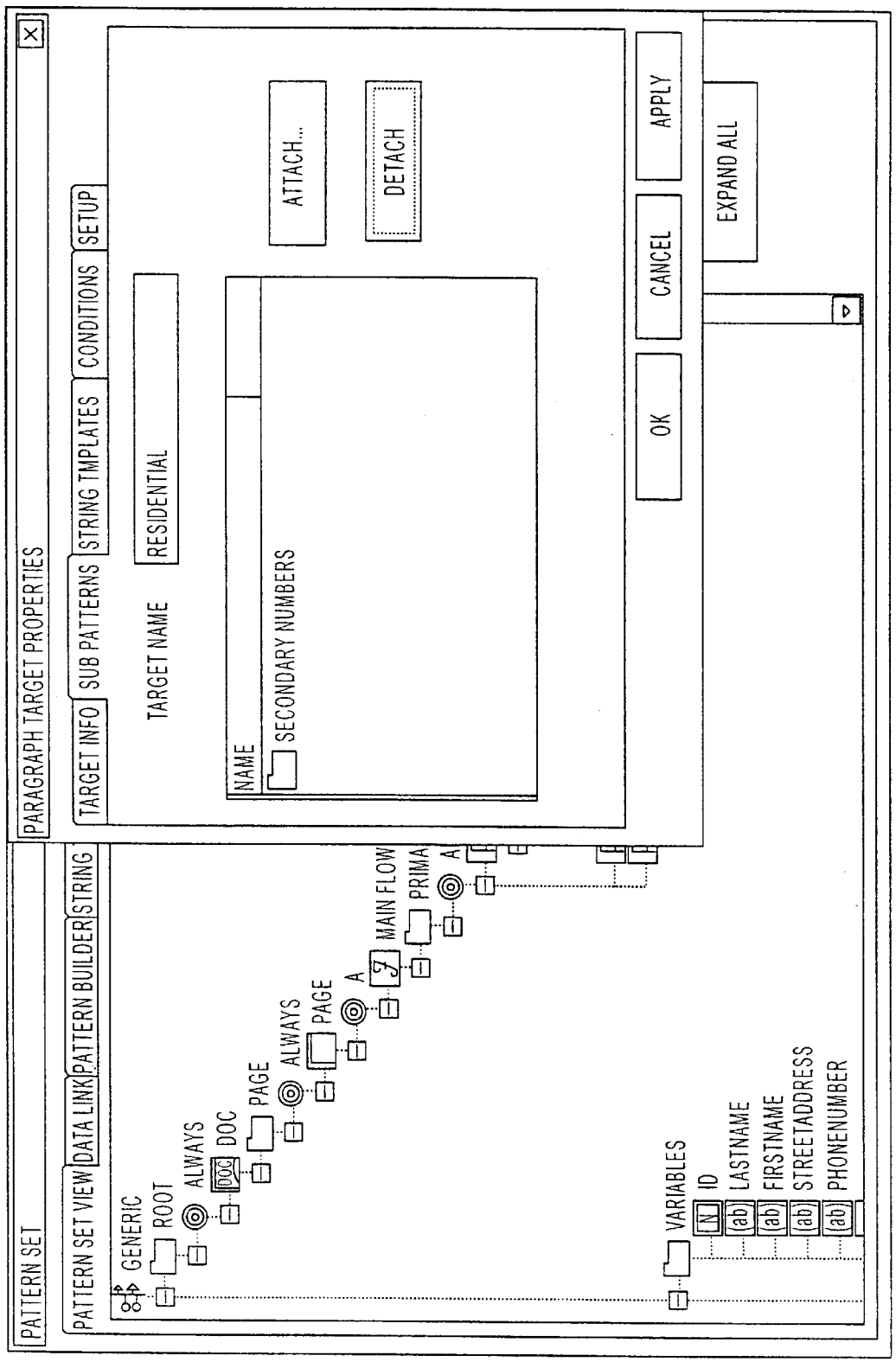
FIG. 2 is a screen sample of a Paragraph Properties dialog box.

FIG. 2 shows the Paragraph Target Properties dialog box opened by choosing a target object and clicking the Pattern Set View dialog box Object Properties button.

Data Link

Figure 3:
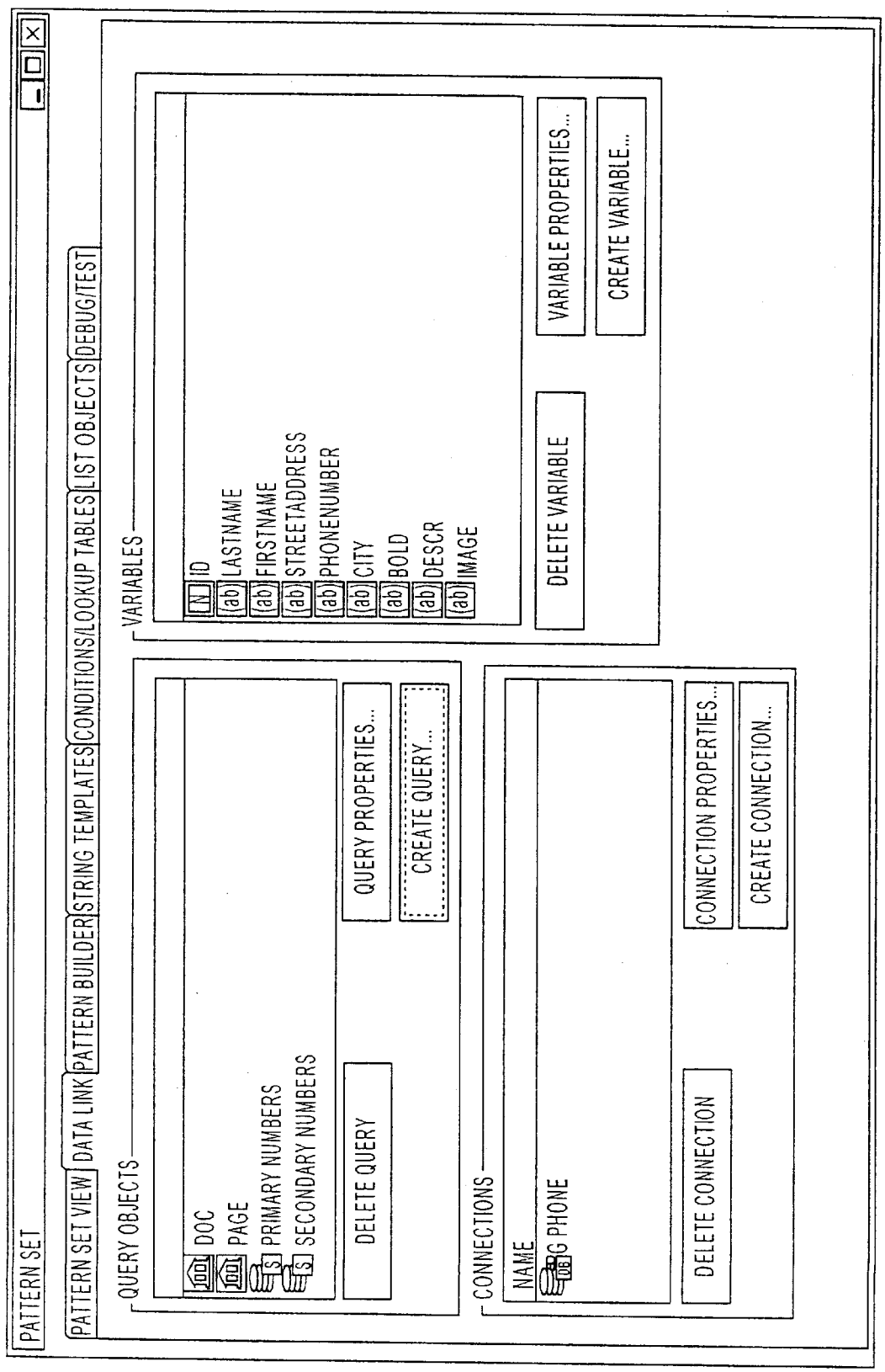
FIG. 3 is a screen sample of a Data Link tab dialog box.

The Data Link tab dialog shown in FIG. 3 is used to connect variable database information to variable objects that can be referred to be name and can be used to either build textual content or direct various formatting decisions. This establishes the connection between the database and the software of the present invention.

Figure 4:
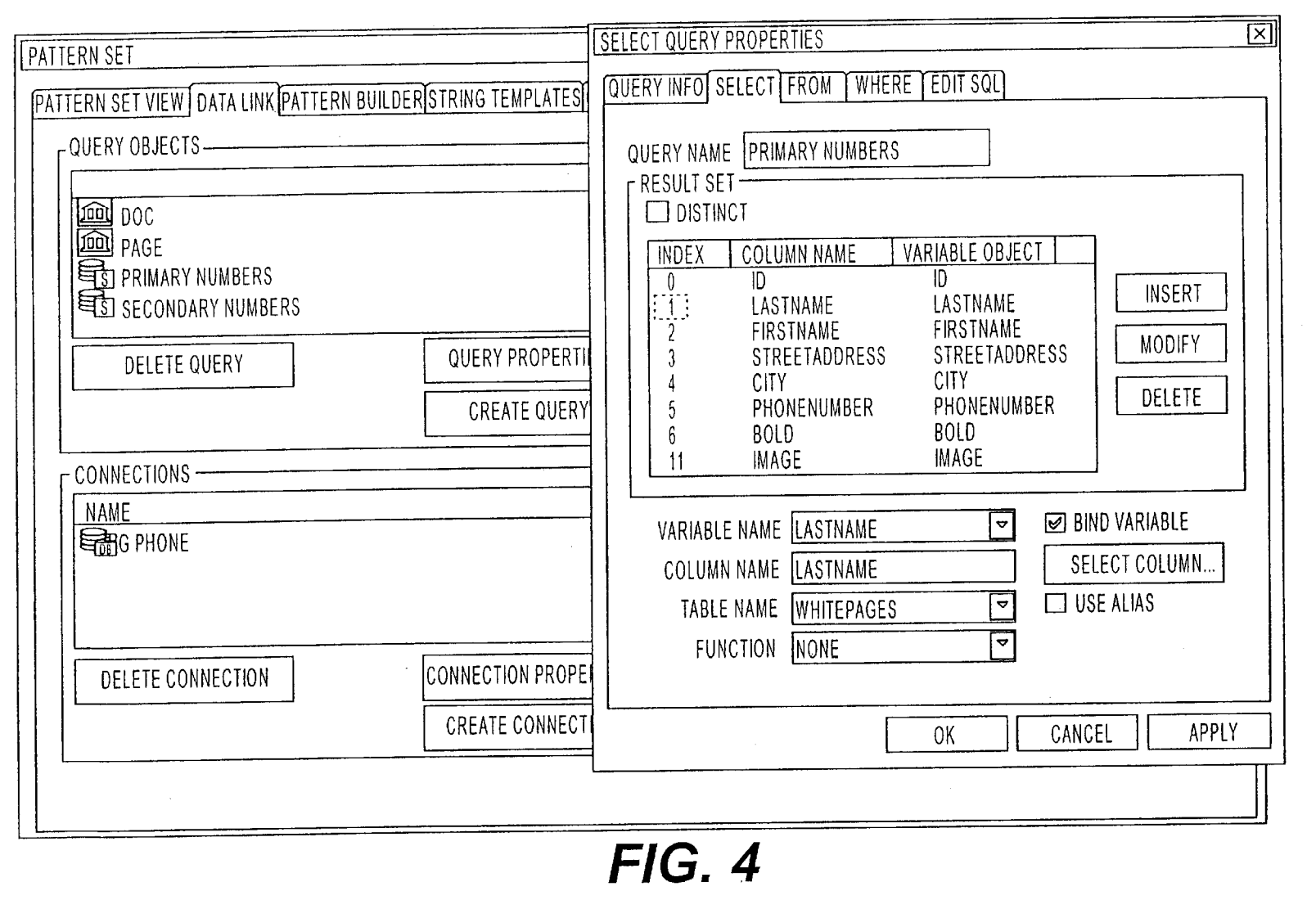

FIG. 4 shows the Query Properties dialog window under the Data Link tab where queries are developed to obtain information from the database.

Figure 5:
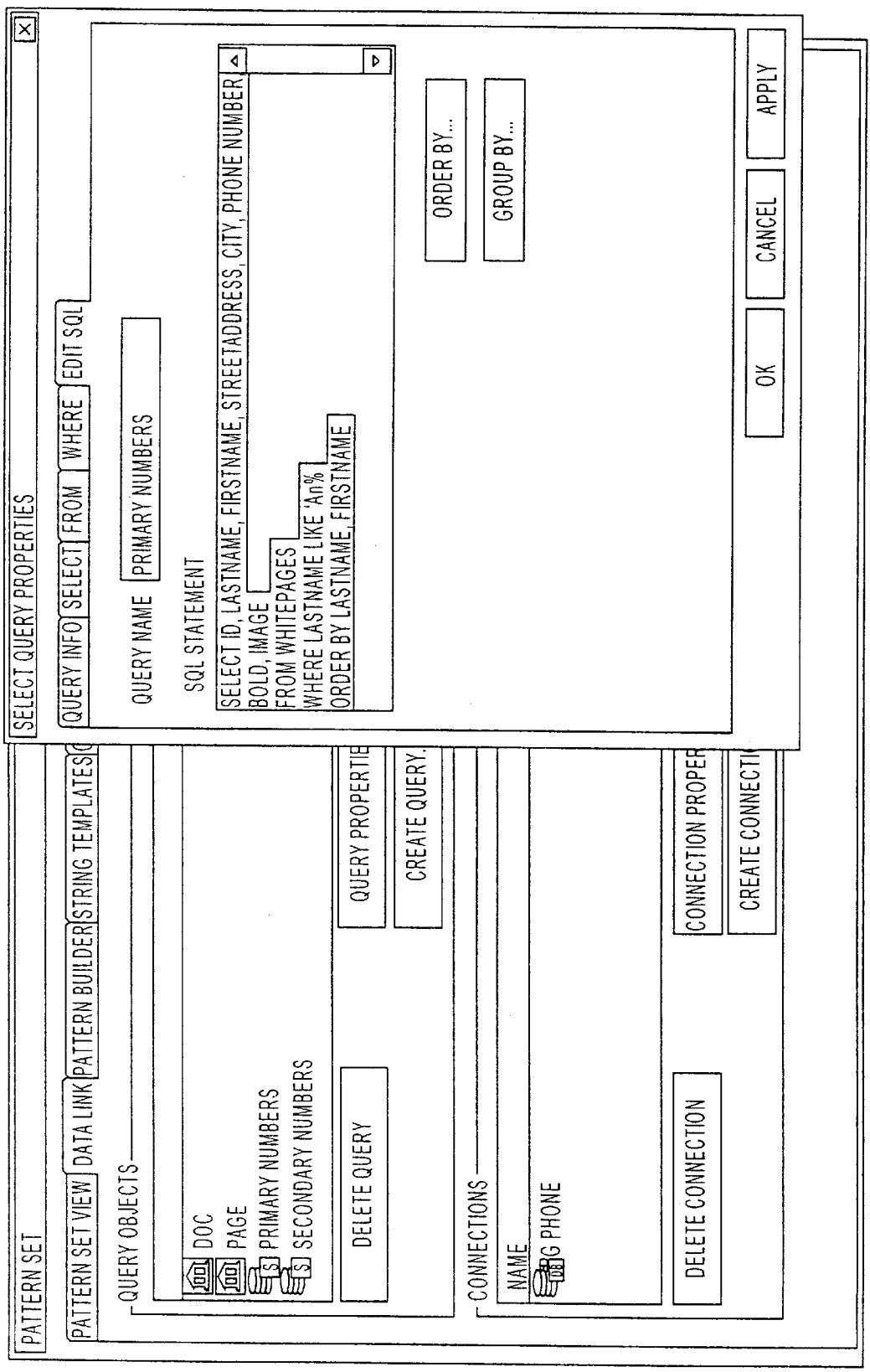
FIG. 5 is a screen sample of a Data Link Query Properties dialog box.

FIG. 5 shows the selection of "where" and "order by" SQL statements.

Pattern Builder

Figure 6:
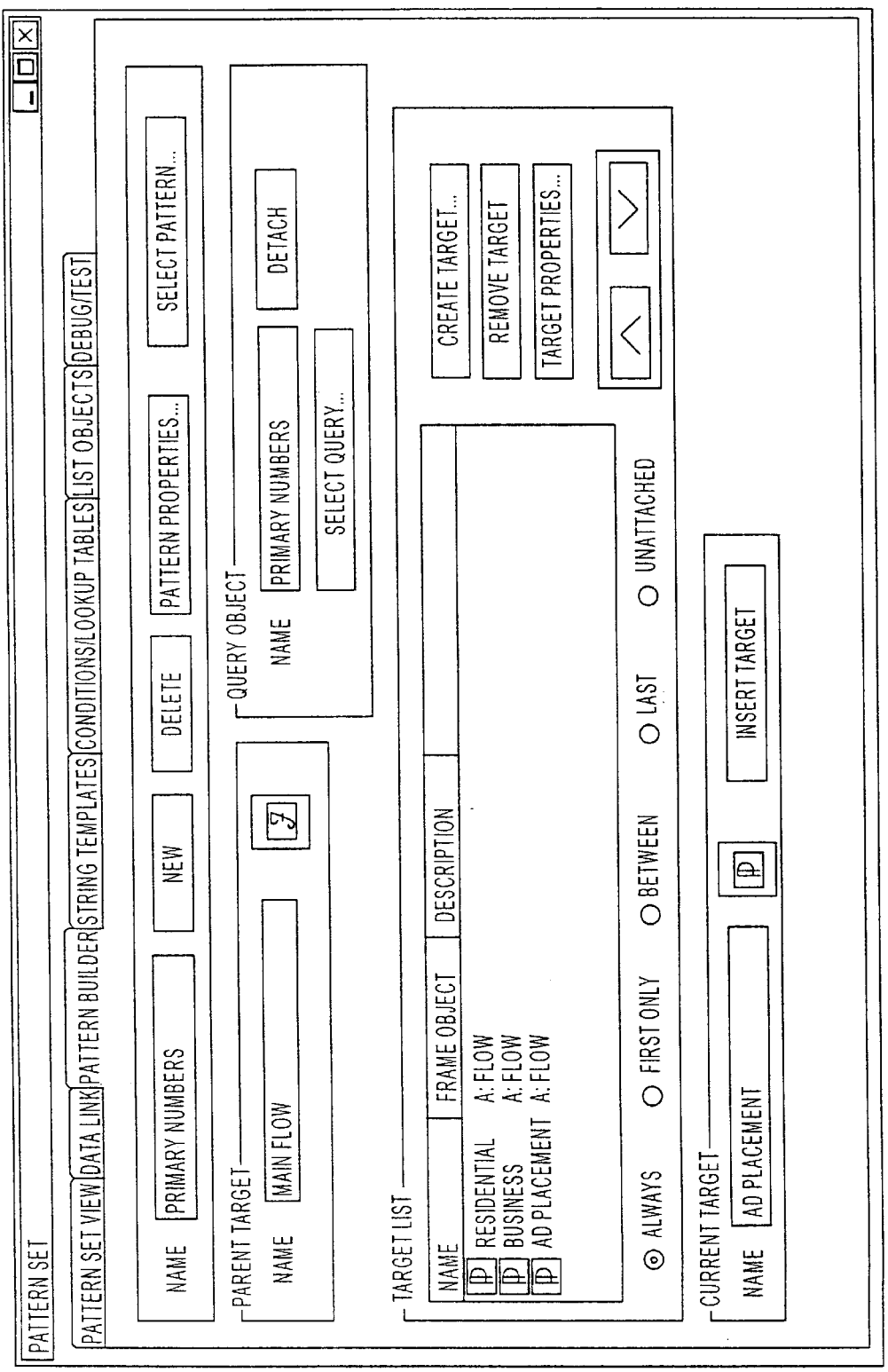
FIG. 6 is a screen sample of a Pattern Builder tab dialog box.

The Pattern Builder tab dialog, as shown in FIG. 6, is used to build the information pattern. This establishes the motif in which the information is to be published. For example, a directory may have information that includes firm name, address, and telephone number, each having to go on a separate line using a different style. In this case, the pattern of the three paragraphs is repeated for as many times as there are firm names (i.e., answers to a particular query). The invention can enable a non-programmer to construct patterns of indefinite complexity.

Figure 7:
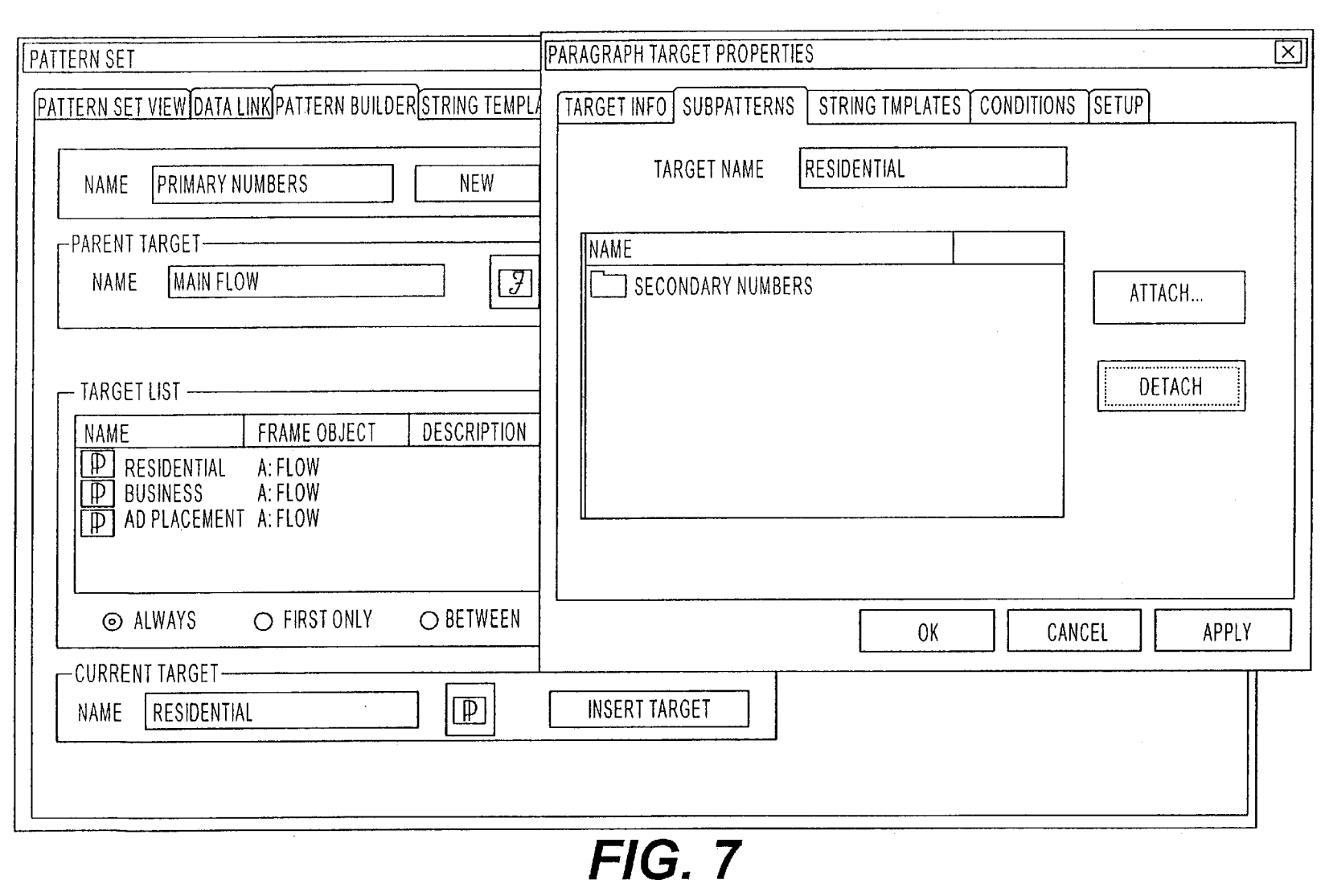

Additionally, under the Pattern Builder tab, users can add sub-patterns and additional string templates for increased information complexity, such as shown in FIG. 7.

String Template Builder

Figure 8:
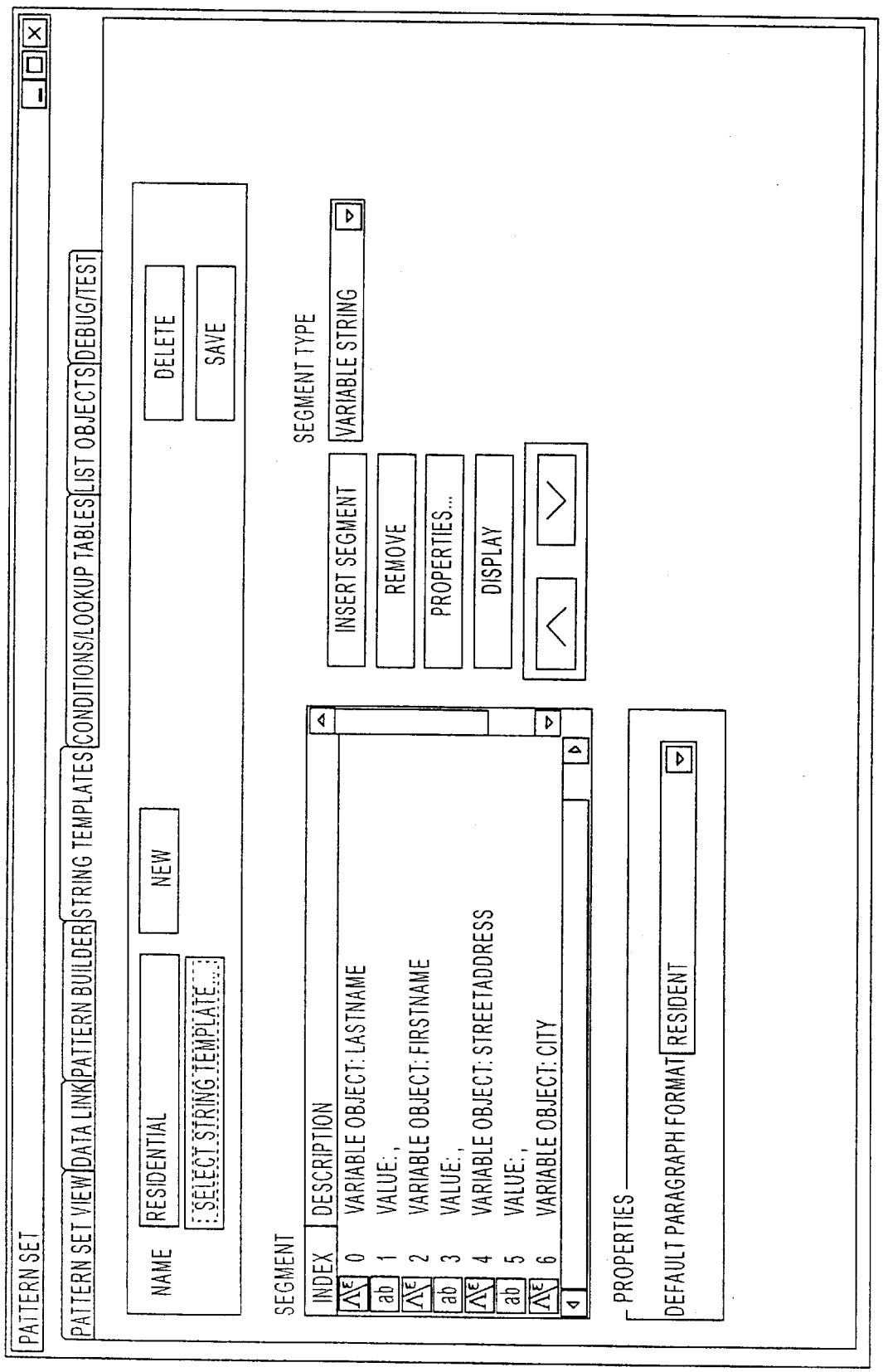
FIG. 8 is a screen sample of a String Template Builder tab dialog box.

As shown in FIG. 8, the String Template Builder tab dialog is used to construct text strings for publishing. It assigns character tags to segments of variable or constant textual information.

Figure 9:
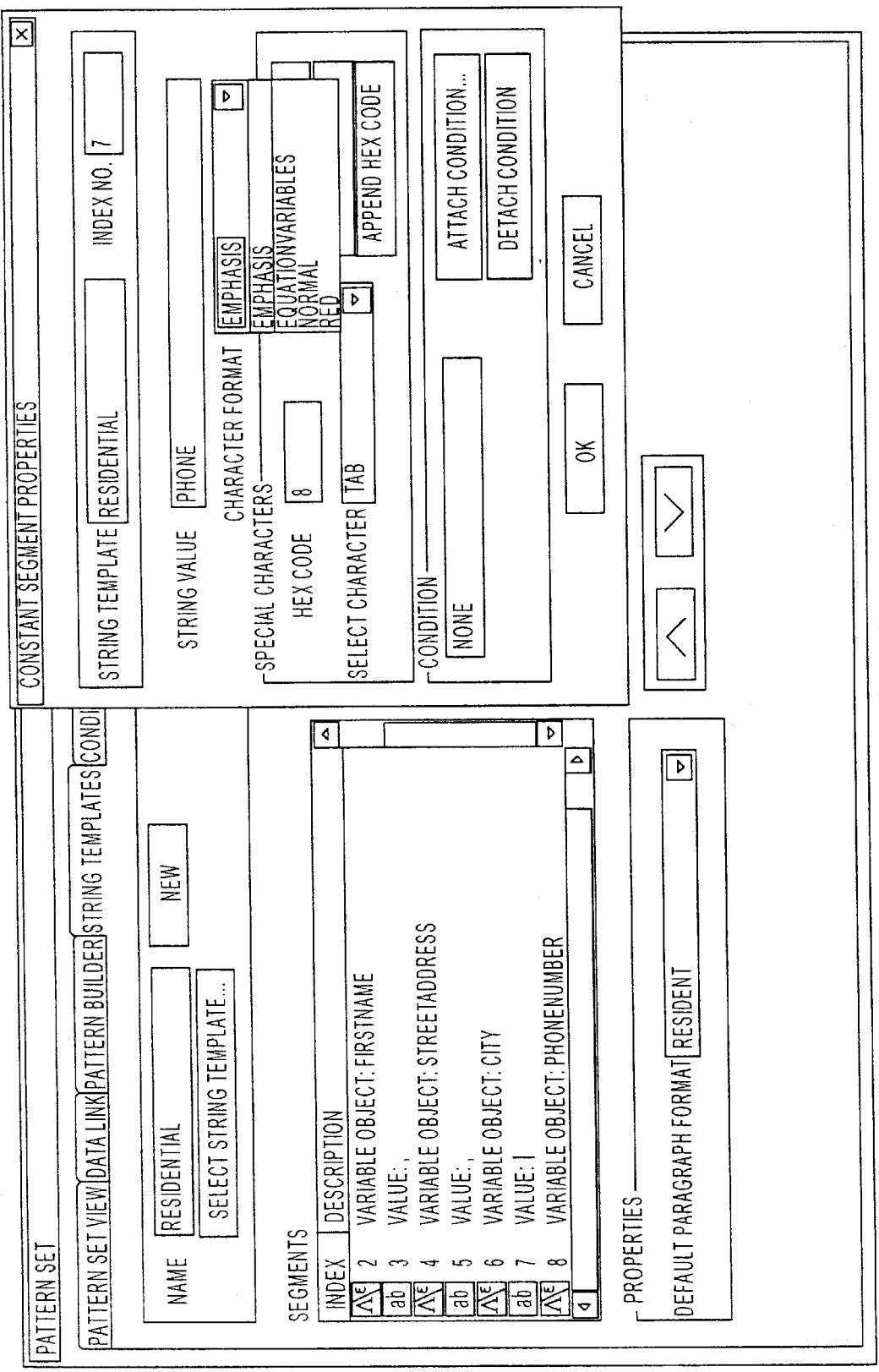
FIG. 9 is a screen sample of a String Template Builder Paragraph Properties dialog box.

For example, in FIG. 9, the word "Phone" appearing before a variable phone number would be represented by a String Template object (constant and variable dialogs) with two segments, the first containing the constant string "Phone" and an assigned emphasis character tag, followed by a variable object containing the current value of the phone number.

Figure 10:
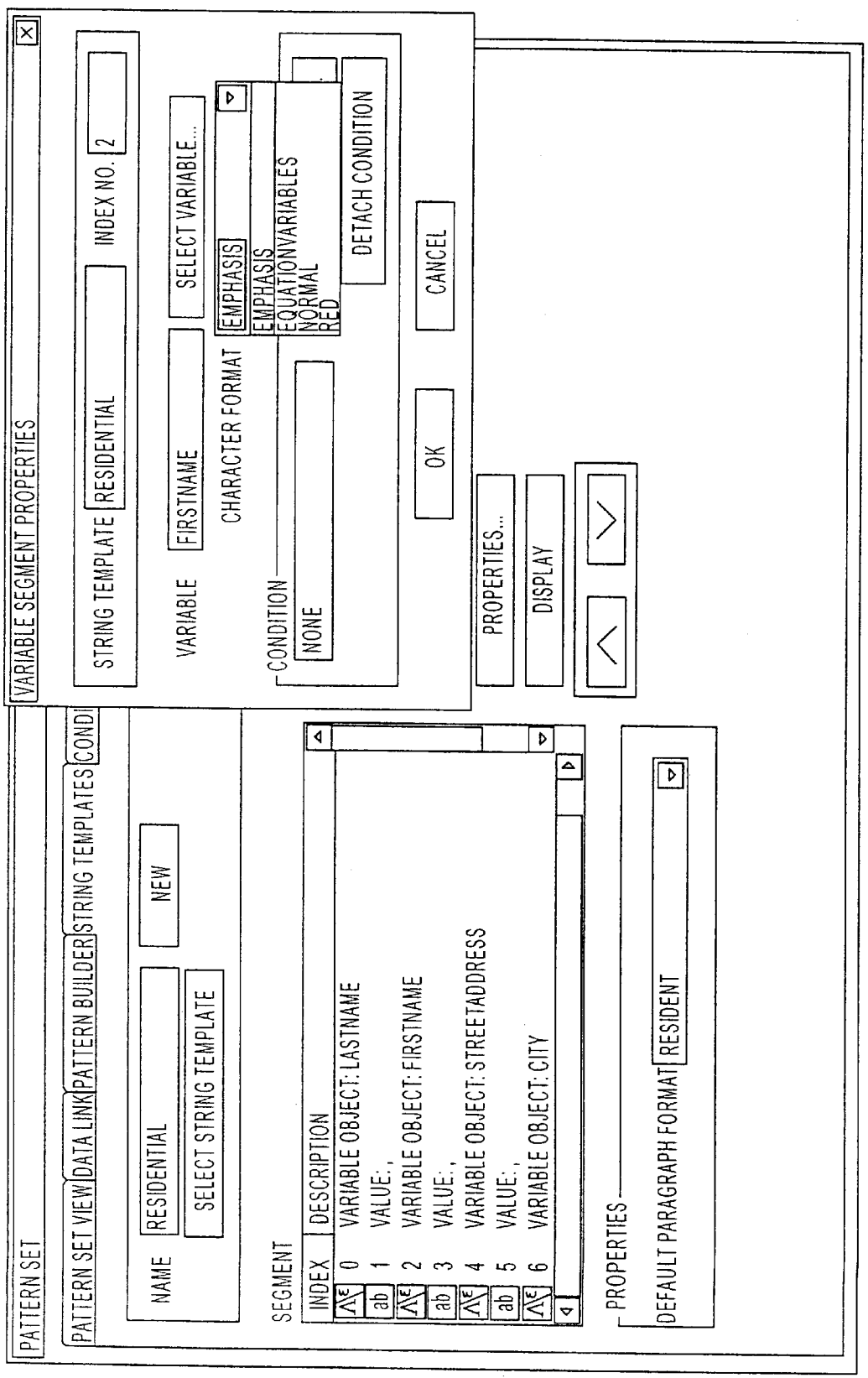
FIG. 10 is a screen sample of a String Template Variable Segment Properties dialog box.

FIG. 10 illustrates that, using the String Template Builder, specific character formats can be associated with any portion of textual information.

Figure 11:
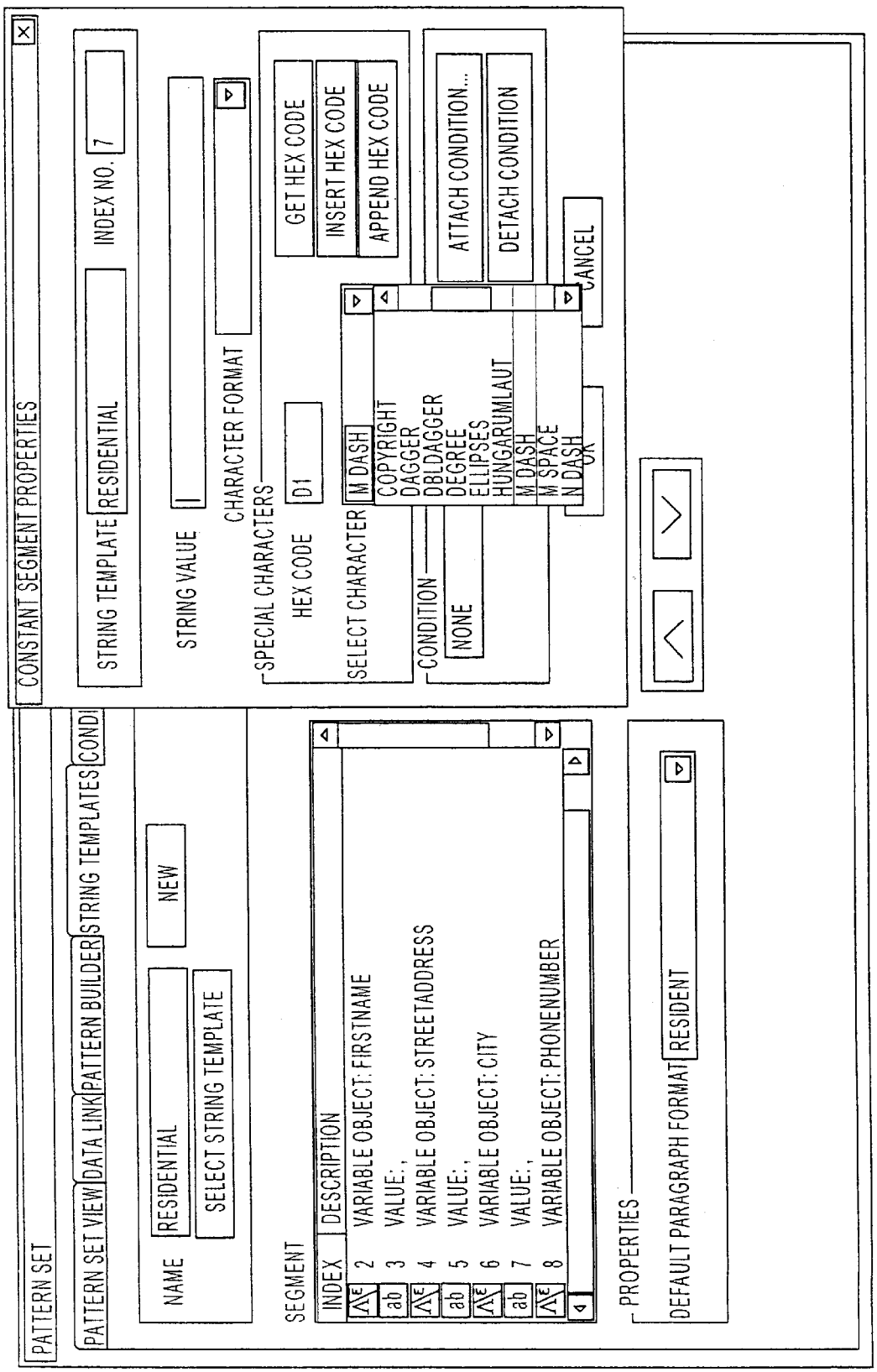
FIG. 11 is a screen sample of a String Template Variable Segment Constant Segment properties dialog box.

Also, using the String Template Builder, FrameMaker hexadecimal codes can be used as part of the constant text information, as shown in FIG. 11.

Conditions/Lookup Table

Figure 12:
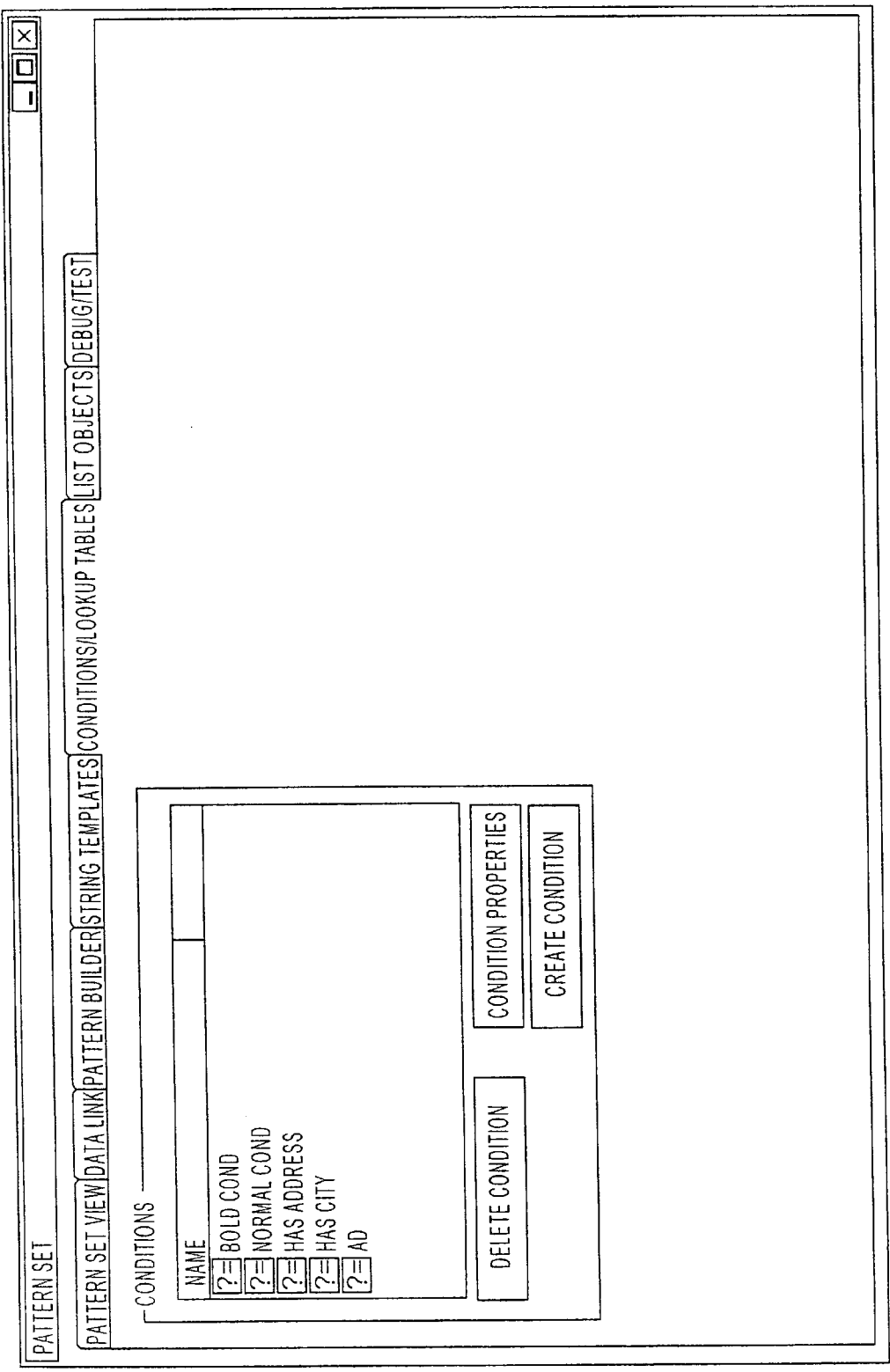
FIG. 12 is a screen sample of a Conditions/Lookup tab dialog box.

The Conditions/Lookup tab dialog shown in FIG. 12 is used to set the conditions to be used for publishing decisions. For example, in a phone directory it may be desirable to format the business listings in bold type for emphasis. A condition can be established so that any business receives a bold entry in the FrameMaker document.

Figure 13:
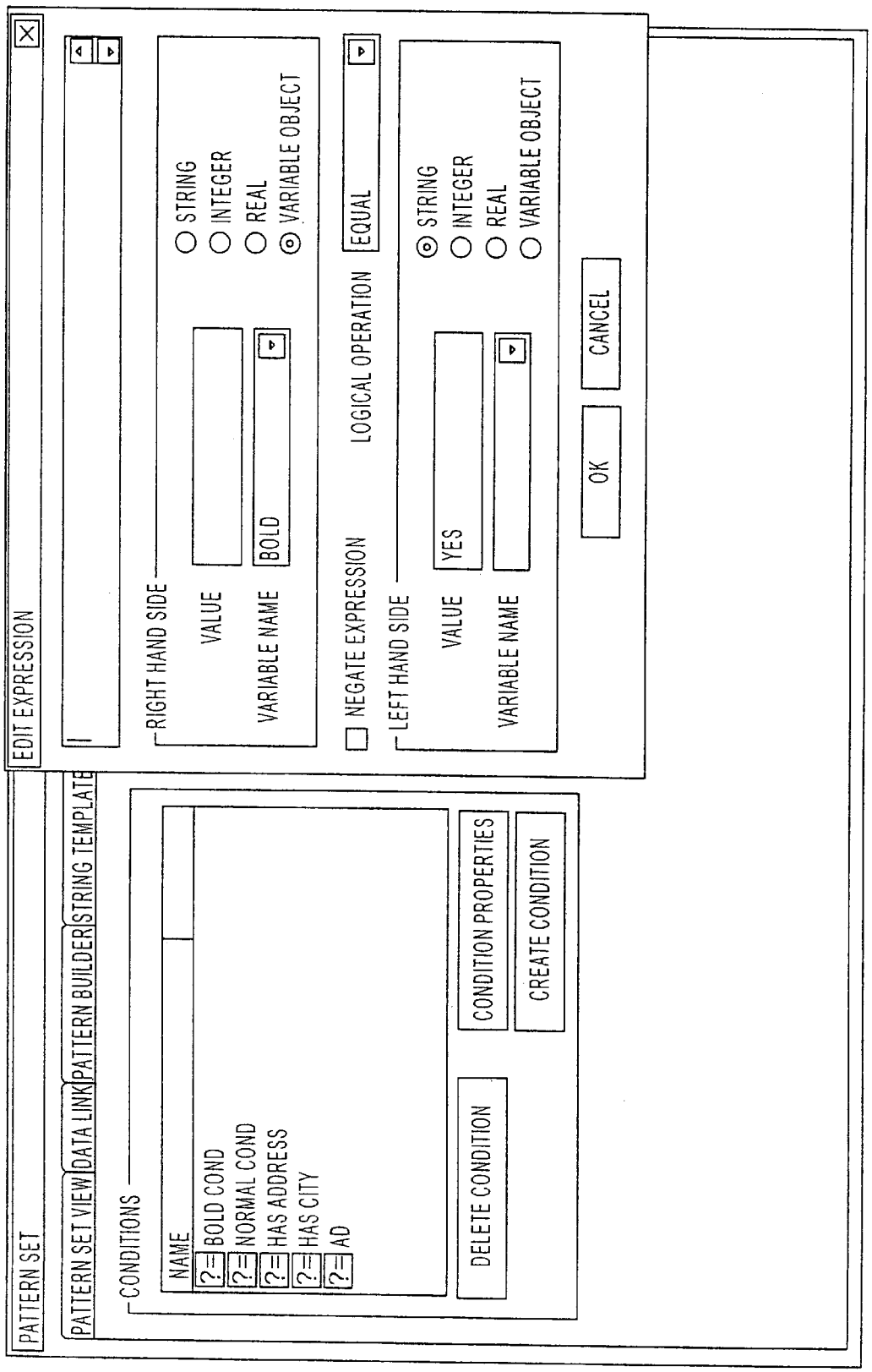
FIG. 13 is another screen sample of Condition/Lookup dialog box.

As shown in FIG. 13, conditions can also be used to select which items are published in a document. The value of a condition can be dependent upon the current value of assigned variable objects which derive their value from the database.

Figure 15:
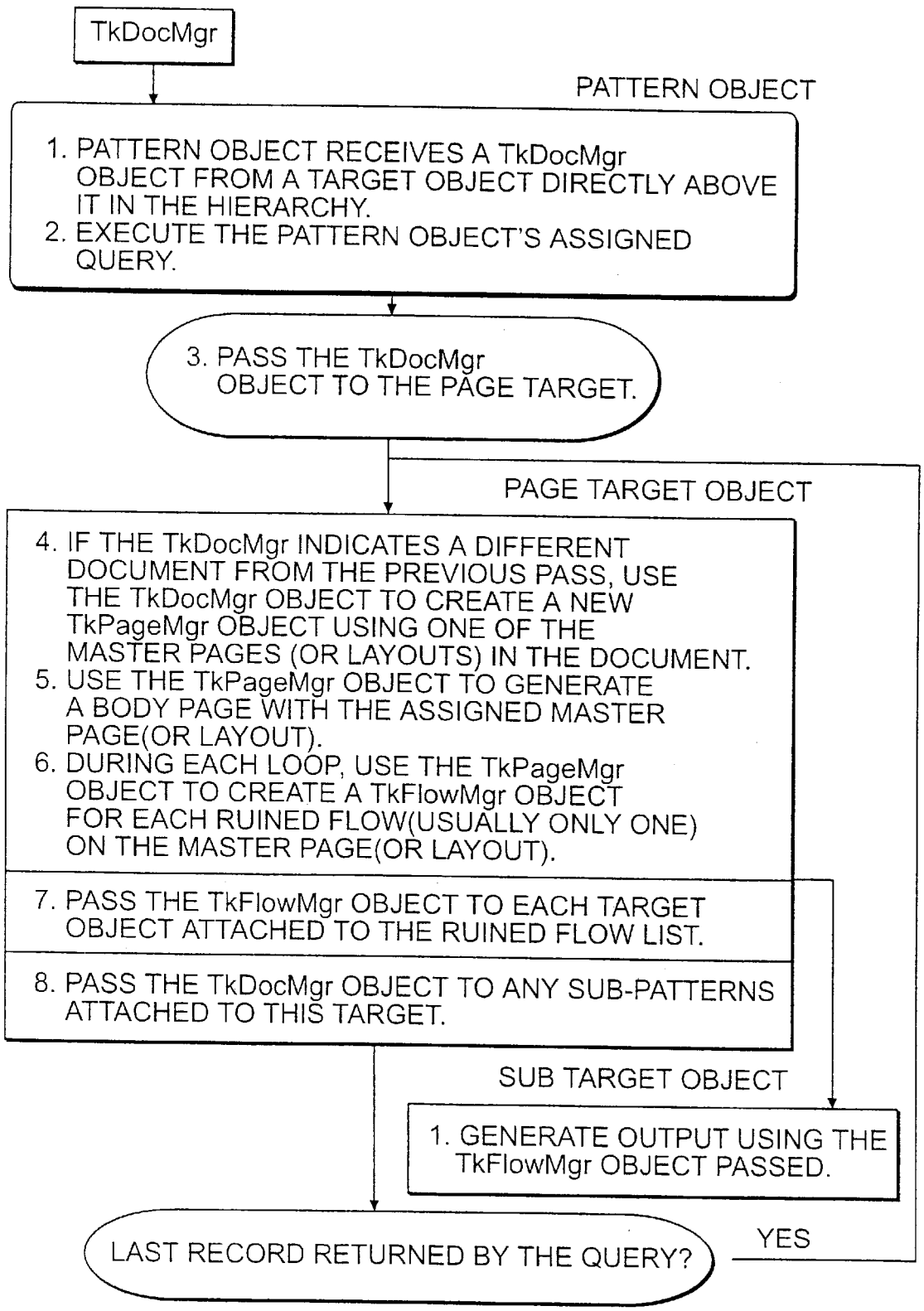
FIG. 15 is an example flow diagram for a typical a pattern with a page target.

The following is in reference to FIG. 15, which is an example setup of a page target.

With reference to FIG. 15, the TkDocMgr (Token Document Manager) object is used for managing an entire document. The following information is accessed through the TkDocMgr object: the names of all the layouts or master pages contained in a document, the names of paragraph tags or styles, the names of character formats, the names of table formats, and any other objects that are global to a given document.

The TkPageMgr (Token Page Manager) object is used for managing a series of connected pages all using a same layout of background or mater page, wherein connected means that the text will flow from one page to the next.

The TkFlowMgr (Token Flow Manager) object is used for managing text flow. The TkFlowMgr keeps track of insertion point. When a target object generates output by creating a paragraph or a table, it uses the TkFlowMgr object passed to it from a previous object to insert the new paragraph or table into the document. The TkFlowMgr will move the insertion point appropriately. The current object then passes the TkFlow Mgr object to the next object in the hierachy.

The actual state of the document is kept encapsulated by the token manager objects, i.e. TkDockMgr, TkPageMgr and TkFlowMgr. The target objects, such as the page target and the table target, know how they are supposed to generate their output. However, the target objects do not know where in the document or in what context to generate the output. The target objects operate on the current document only through the token manager objects that they have been passed. The target objects, through their attachment to pattern objects and to other target objects, such as sub-target objects, reflect the logical structure of the desired output based on the structure of the database. The token manager objects reflect the structure of the actual output document. By forcing the target object to manipulate the document only through the token manager objects, the two entirely different structures are decoupled.

It is the decoupling that allows virtually unlimited complexity on the pattern/target side of the boundary without having to relate this complexity to the output document, which has a structure that is in general not the same or in sync with the patern/target side.

The invention according to a preferred embodiment is used as follows. First, a template or a series of templates is created using software associated with the formatting engine (e.g., FrameMaker). If the product to be published is in the form of a book, several templates may be designed to represent sections of the book. The present invention in its preferred embodiment uses the formatting information contained in a FrameMaker template directly to control the database information formatting.

Once the formatting engine's templates are complete, the invention's pattern set template can be set up using the GUI. The FrameMaker templates can be modified as the database pattern set template is developed. This provides the ability to publish a page or two and view, modify, or make necessary corrections "on-the-fly," thereby permitting rapid development and publishing of database derived products.

The invention set forth above can provide significant advantages, such as enabling a user to rapidly set up database publishing projects using a GUI; connect to any, or multiple, ODBC and SQL compliant databases; establish conditions; implement data driven formatting including master page selection, template selection, table and paragraph formats; re-configure table structures dynamically; conduct sub-queries; create data driven index markers for automatic index creation; build strings comprised of constant and variable (database) information; publish and dynamically scale images; publish complex table structures including straddles, shading, and ruling; work in a batch mode to generate PDF documents dynamically; and directly interface with formatting engines and associated templates for formatting control and output.

The present invention can be used, e.g., to generate dynamic documents through the internet, intranet, or extranet $W^3$-based front-ends. The invention may be used to generate output in PDF directly from a database using a batch mode operation. The invention may be used to provide a user with the ability quickly to go on-line, select the information they desire, click "publish", and receive a PDF file of the information as an e-mail attachment.

While the invention has been particularly shown and described with reference to a preferred embodiment thereof, it will be understood by those skilled in the art that various changes in form and details may be made therein without departing from the spirit and scope of the invention.

The embodiments of the invention in which an exclusive property or privilege is claimed are defined as follows:

1. A method for direct connection between a data server and a formatting engine comprising:

using a hierarchical structure of target objects, token manager objects, and pattern objects to query data records from the data server and to create an output document for input to the formatting engine, wherein said target objects contain the contents of the document, said token manager objects manage the insertion of data and their logical location in the document, said pattern objects perform queries on the data server, and wherein said token manager objects reflect the structure of the actual output document, and the target objects reflect the logical structure of the desired output based upon the structure of the database, whereby said target objects manipulate the document through said token manager objects and said structures are decoupled.

2. The method according to claim 1, wherein said token manager objects comprise a document token, a page token, a flow token, and a table token.

3. The method according to claim 1, wherein said token objects comprise a table target, a paragraph target, and a page target.

4. The method according to claim 1, wherein said target object comprises a string template object.

5. The method according to claim 1, wherein said target object comprises a conditional object.

6. The method according to claim 1, wherein said pattern objects comprise one or more sub-pattern.

7. The method according to claim 1, wherein said data server is a database compliant with Open Database Connectivity and Structured Query Language.

* * * * *